US011425693B2

(12) United States Patent
Rakib et al.

(10) Patent No.: US 11,425,693 B2
(45) Date of Patent: *Aug. 23, 2022

(54) MULTIPLE ACCESS IN WIRELESS TELECOMMUNICATIONS SYSTEM FOR HIGH-MOBILITY APPLICATIONS

(71) Applicant: Cohere Technologies, Inc., Santa Clara, CA (US)

(72) Inventors: Shlomo Rakib, Santa Clara, CA (US); Ron Hadani, Austin, TX (US)

(73) Assignee: Cohere Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/946,966

(22) Filed: Jul. 13, 2020

(65) Prior Publication Data
US 2020/0351836 A1   Nov. 5, 2020

Related U.S. Application Data

(63) Continuation of application No. 16/153,577, filed on Oct. 5, 2018, now Pat. No. 10,716,095, which is a
(Continued)

(51) Int. Cl.
*H04W 56/00* (2009.01)
*H04W 72/04* (2009.01)
(Continued)

(52) U.S. Cl.
CPC .......... *H04W 72/04* (2013.01); *H04B 1/0475* (2013.01); *H04B 1/62* (2013.01);
(Continued)

(58) Field of Classification Search
CPC ....... H04W 72/04; H04B 1/0475; H04B 1/62; H04J 11/003; H04L 11/003; H04L 1/0018;
(Continued)

(56) References Cited

U.S. PATENT DOCUMENTS

| 4,754,493 A | 6/1988 | Coates |
| 5,083,135 A | 1/1992 | Nagy et al. |

(Continued)

FOREIGN PATENT DOCUMENTS

| CN | 1235720 A | 11/1999 |
| CN | 101002448 A | 7/2007 |

(Continued)

OTHER PUBLICATIONS

Office Action for U.S. Appl. No. 13/117,119, dated Aug. 5, 2013, 5 pages.
(Continued)

*Primary Examiner* — Sai Ming Chan
(74) *Attorney, Agent, or Firm* — Perkins Coie LLP

(57) ABSTRACT

A wireless telecommunications system that mitigates infra-symbol interference due to Doppler-shift and multipath and enables multiple access in one radio channel. Embodiments of the present invention are particularly advantageous for wireless telecommunications systems that operate in high-mobility environments, including high-speed trains and airplanes.

30 Claims, 16 Drawing Sheets

Related U.S. Application Data continuation of application No. 15/410,622, filed on Jan. 19, 2017, now Pat. No. 10,098,092.

(60) Provisional application No. 62/316,243, filed on Mar. 31, 2016, provisional application No. 62/316,298, filed on Mar. 31, 2016.

(51) Int. Cl.
| | |
|---|---|
| *H04B 1/62* | (2006.01) |
| *H04B 1/04* | (2006.01) |
| *H04L 23/02* | (2006.01) |
| *H04L 25/03* | (2006.01) |
| *H04L 27/26* | (2006.01) |
| *H04L 5/00* | (2006.01) |
| *H04J 11/00* | (2006.01) |
| *H04L 27/04* | (2006.01) |
| *H04L 1/00* | (2006.01) |
| *H04B 15/00* | (2006.01) |
| *H04L 27/06* | (2006.01) |

(52) U.S. Cl.
CPC .......... *H04J 11/003* (2013.01); *H04L 1/0018* (2013.01); *H04L 5/0014* (2013.01); *H04L 5/0016* (2013.01); *H04L 5/0023* (2013.01); *H04L 5/0044* (2013.01); *H04L 23/02* (2013.01); *H04L 25/03006* (2013.01); *H04L 25/03834* (2013.01); *H04L 27/04* (2013.01); *H04L 27/265* (2013.01); *H04L 27/2626* (2013.01); *H04L 27/2634* (2013.01); *H04L 27/2655* (2013.01); *H04L 27/2697* (2013.01); *H04B 15/00* (2013.01); *H04L 27/06* (2013.01)

(58) Field of Classification Search
CPC ... H04L 5/0014; H04L 5/0016; H04L 5/0023; H04L 5/0044; H04L 23/02; H04L 25/03006; H04L 25/03834; H04L 27/04; H04L 27/2626; H04L 27/2634; H04L 27/265; H04L 27/2655; H04L 27/2697
USPC ........................................................ 370/329
See application file for complete search history.

(56) References Cited

U.S. PATENT DOCUMENTS

| | | | |
|---|---|---|---|
| 5,182,642 A | 1/1993 | Gersdorff et al. |
| 5,623,511 A | 4/1997 | Bar-David et al. |
| 5,831,977 A | 11/1998 | Dent |
| 5,835,529 A | 11/1998 | Koga et al. |
| 5,872,542 A | 2/1999 | Simons et al. |
| 5,956,624 A | 9/1999 | Hunsinger et al. |
| 6,055,415 A | 4/2000 | Suzuki |
| 6,212,246 B1 | 4/2001 | Hendrickson |
| 6,289,063 B1 | 9/2001 | Duxbury |
| 6,356,555 B1 | 3/2002 | Rakib et al. |
| 6,381,234 B2 | 4/2002 | Sakoda et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,010,048 B1 | 3/2006 | Shattil |
| 7,327,812 B2 | 2/2008 | Auer |
| 7,392,018 B1 | 6/2008 | Ebert et al. |
| 7,689,049 B2 | 3/2010 | Monro |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,717,210 B2 | 5/2014 | Eldar et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,479,381 B2 | 10/2016 | Siohan et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,668,148 B2 | 5/2017 | Hadani et al. |
| 9,712,354 B2 | 7/2017 | Hadani et al. |
| 9,729,281 B2 | 8/2017 | Hadani et al. |
| 9,819,519 B2 | 11/2017 | Rakib et al. |
| 10,098,092 B2 | 10/2018 | Rakib et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0157778 A1 | 7/2005 | Trachewsky et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 | 11/2010 | Potkonjak |

(56) References Cited

U.S. PATENT DOCUMENTS

| | | |
|---|---|---|
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Riu et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0080725 A1* | 3/2015 | Wegner ............... G01S 15/8997 600/440 |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0157146 A1* | 6/2016 | Karabinis ........... H04W 36/026 370/334 |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib et al. |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |

FOREIGN PATENT DOCUMENTS

| | | |
|---|---|---|
| CN | 101304276 A | 11/2008 |
| CN | 101388872 A | 3/2009 |
| CN | 101682316 A | 3/2010 |
| CN | 101939935 A | 1/2011 |
| CN | 102064852 A | 5/2011 |
| EP | 1432168 A1 | 6/2004 |
| JP | 2011127910 A | 6/2011 |
| KR | 101129205 B1 | 3/2012 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011478 | 1/2017 |

OTHER PUBLICATIONS

Notice of Allowance for U.S. Appl. No. 13/117,119, dated Feb. 28, 2014, 13 pages.

Banelli, P. et al., "Modulation Formats and Waveforms for 5G Networks: Who Will Be the Heir of OFDM?," IEEE Signal Processing Magazine, vol. 81, pp. 80-93, Nov. 2014.

El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.

Rusek, F. et al., "Scaling Up MIMO, Opportunities and Challenges with Very Large Arrays," IEEE Signal Processing Magazine, pp. 40-60 (2013).

Vodafone, "Cellular Internet of Things: Architectural Aspects," RP-150869, 3GPP RAN#68, Malmo, Sweden (Jun. 9, 2015), 19 pages.

Supplementary European Search Report for European Application No. 11787483.4, dated Sep. 9, 2014, 6 pages.

International Search Report and Written Opinion for International Application No. PCT/US2011/038302, dated Nov. 15, 2011, 8 pages.

International Preliminary Report on Patentability for International Application No. PCT/US2011/038302, dated Dec. 4, 2012, 7 pages.

Office Action for U.S. Appl. No. 13/117,124, dated Feb. 22, 2013, 7 pages.

Notice of Allowance for U.S. Appl. No. 13/117,124, dated Aug. 8, 2013, 10 pages.

Office Action for U.S. Appl. No. 14/605,957, dated Jun. 22, 2017, 6 pages.

Supplementary European Search Report for European Application No. 13809004.8, dated Apr. 14, 2016, 8 pages.

Communication Pursuant to Article 94(3) EPC for European Application No. 13809004.8, dated Feb. 17, 2017, 5 pages.

Notice of Allowance for U.S. Appl. No. 13/927,087, dated Feb. 25, 2015, 9 pages.

Office Action for U.S. Appl. No. 13/927,087, dated Nov. 12, 2014, 14 pages.

Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).

International Search Report and Written Opinion for International Application No. PCT/US2013/047723, dated Oct. 29, 2013, 17 pages.

International Preliminary Report on Patentability for International Application No. PCT/US2013/047723, dated Dec. 31, 2014, 15 pages.

(56) References Cited

OTHER PUBLICATIONS

Notice of Allowance for U.S. Appl. No. 13/927,088, dated Feb. 18, 2015, 7 pages.
Office Action for U.S. Appl. No. 13/927,088, dated Nov. 28, 2014, 13 pages.
Notice of Allowance for U.S. Appl. No. 13/927,086, dated Dec. 26, 2014, 8 pages.
Supplemental Notice of Allowability for U.S. Appl. No. 13/927,086, dated Mar. 19, 2015, 4 pages.
Office Action for U.S. Appl. No. 13/927,086, dated Oct. 14, 2014, 10 pages.
Office Action for U.S. Appl. No. 13/927,089, dated Dec. 24, 2014, 13 pages.
Office Action for U.S. Appl. No. 13/927,089, dated Aug. 14, 2015, 7 pages.
Supplemental Notice of Allowability for U.S. Appl. No. 13/927,091, dated Jun. 11, 2015, 4 pages.
Notice of Allowance for U.S. Appl. No. 13/927,091, dated Apr. 24, 2015, 8 pages.
Office Action for U.S. Appl. No. 13/927,091, dated Jan. 27, 2015, 15 pages.
Office Action for U.S. Appl. No. 13/927,092, dated Oct. 8, 2014, 5 pages.
Notice of Allowance for U.S. Appl. No. 13/927,092, dated Oct. 24, 2014, 7 pages.
Office Action for U.S. Appl. No. 13/927,095, dated Apr. 30, 2015, 11 pages.
Office Action for U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Examination Report No. 1 for Australian Application No. 2013239970, dated Dec. 8, 2015, 3 pages.
"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network.html>, 5 pages.
Catt, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.
International Search Report and Written Opinion for International Application No. PCT/US2017/025797, dated Jun. 21, 2017, 6 pages.
International Search Report and Written Opinion for International Application No. PCT/US2016/030259, dated Aug. 4, 2016, 13 pages.
Office Action for U.S. Appl. No. 15/152,464, dated Apr. 6, 2017, 10 pages.
Examination Report No. 1 for Australian Application No. 2013280487, dated May 2, 2016, 3 pages.
International Search Report and Written Opinion for International Application No. PCT/US2016/031928, dated Oct. 7, 2016, 10 pages.
Office Action for U.S. Appl. No. 15/188,946, dated May 8, 2017, 14 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
Office Action for U.S. Appl. No. 15/194,494, dated May 5, 2017, 16 pages.
International Search Report and Written Opinion for International Application No. PCT/US2016/039662, dated Nov. 29, 2016, 14 pages.
Office Action for U.S. Appl. No. 15/436,653, dated Jun. 2, 2017, 10 pages.
Office Action for U.S. Appl. No. 15/208,545, dated Aug. 21, 2017, 15 pages.
International Search Report and Written Opinion for International Application No. PCT/US2016/041940, dated Oct. 20, 2016, 8 pages.
Supplementary European Search Report for European Application No. 13768150.8, dated Oct. 30, 2015, 7 pages.
International Search Report and Written Opinion for International Application No. PCT/US2013/033652, dated Jun. 12, 2013, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.
R. Hadani et al., "Orthogonal Time Frequency Space Modulation," 2017 IEEE Wireless Communications and Networking Conference (WCNC), San Francisco, CA, USA, 2017, pp. 1-6.
Mazzaro et al., "Introduction to Stepped-Frequency Radar," US Army RDECOM, Aug. 2013, pp. 1-22 (accessible at http:/lece.citadel.edu/mazzaro/particip/SFR_Intro_Mazzaro.pdf, last accessed May 22, 2017).
Examiner's Amendment and Reasons for Allowance, U.S. Appl. No. 15/215,007, filed May 30, ☐017, pp. 12-15, in particular.
Examiner's Amendment and Reasons for Allowance, U.S. Appl. No. 15/146,987, filed Jan. 25, ☐017, pp. 2-3.
International Search Report and the Written Opinion of the International Searching Authority, International Application No. PCT/US2017/025291, International Filing Date Mar. 31, 2017.
First Examination Report for Indian Application No. 201847037026, dated Nov. 1, 2021, 5 pages.

\* cited by examiner

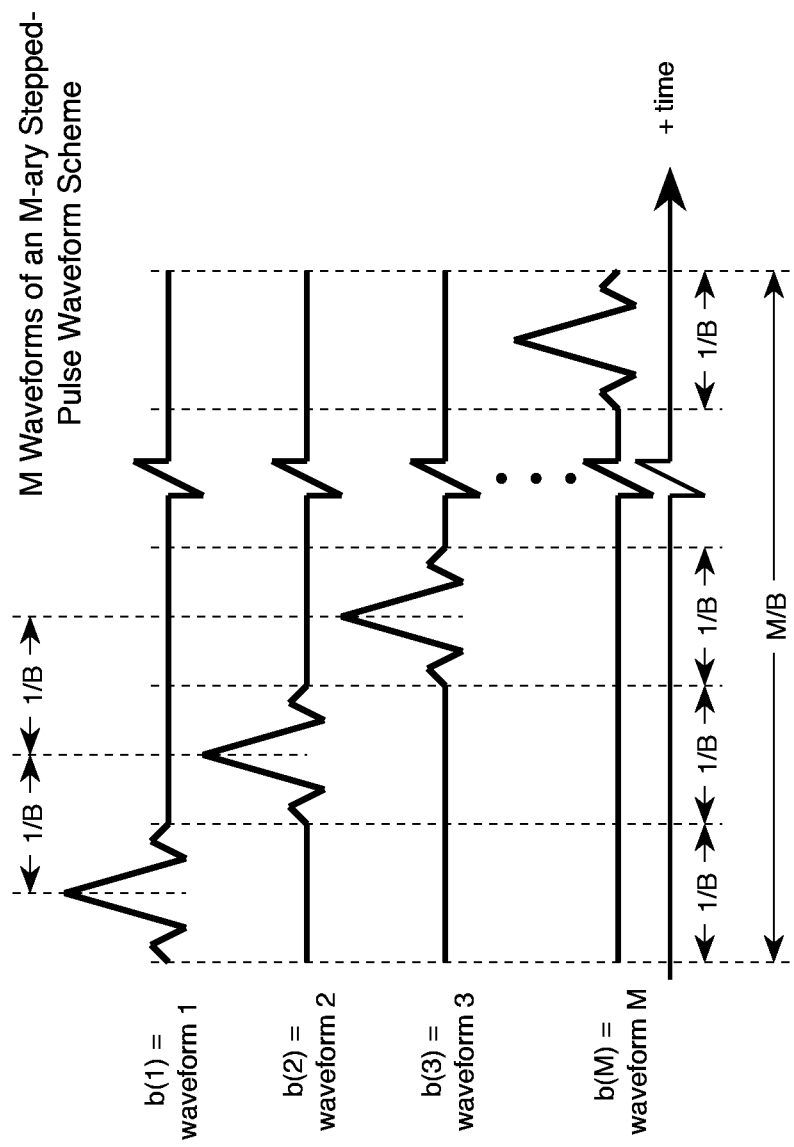

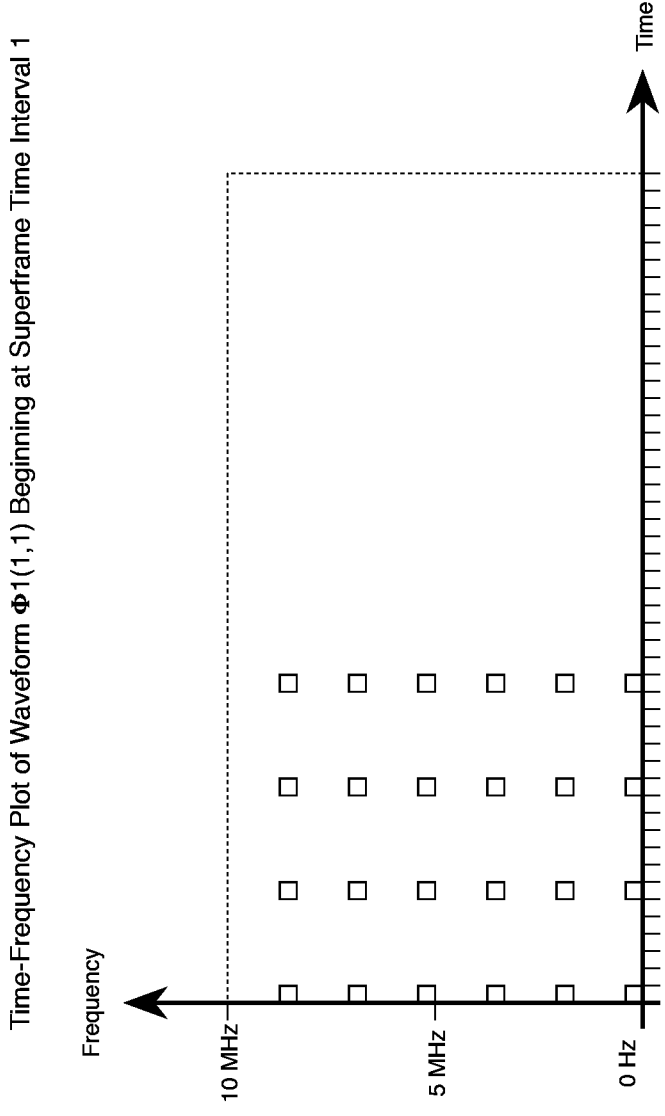

MULTIPLE ACCESS IN WIRELESS TELECOMMUNICATIONS SYSTEM FOR HIGH-MOBILITY APPLICATIONS

STATEMENT OF RELATED APPLICATIONS

This application is a continuation of U.S. patent application Ser. No. 16/153,577, filed on 5 Oct. 2018, which is a continuation of U.S. patent application Ser. No. 15/410,622, filed on 19 Jan. 2017, now U.S. Pat. No. 10,098,092, issued 9 Oct. 2018, which claims benefit of U.S. provisional patent application No. 62/316,243, filed on 31 Mar. 2016, entitled "Robust Wireless Telecommunications System", and U.S. provisional patent application No. 62/316,298, filed on 31 Mar. 2016, entitled "Orthogonal Time Frequency Space" all of which are incorporated by reference.

The following patent applications are incorporated by reference:
  U.S. patent application Ser. No. 15/146,987, filed on 5 May 2016, entitled "Wireless Telecommunications System for High-Mobility Applications", and
  U.S. patent application Ser. No. 15/215,007, filed on 20 Jul. 2016, entitled "Multiple Access in Wireless Telecommunications System for High-Mobility Applications", and
  U.S. patent application Ser. No. 15/410,578, filed on 19 Jan. 2017, entitled "Wireless Telecommunications System for High-Mobility Applications".

FIELD OF THE INVENTION

The present invention relates to wireless telecommunications in general, and, more particularly, to a wireless telecommunications system that can detect and mitigate impairments to its radio signals.

BACKGROUND OF THE INVENTION

A radio signal can be impaired as it propagates from a transmitter to a receiver, and the value of a wireless telecommunications system is substantially dependent on how well the system mitigates the effects of those impairments. In some cases, the transmitter can take preventative measures, and in some cases the receiver can take remedial measures.

SUMMARY OF THE INVENTION

The present invention is a wireless telecommunications system that avoids some of the costs and disadvantages associated with wireless telecommunications systems in the prior art. For example, the illustrative embodiments of the present invention use a modulated radio-frequency carrier signal to convey data items wirelessly through a radio-frequency environment that comprises natural and man-made radio-frequency carrier signal-path impairments (e.g., objects, etc.) that reflect, refract, diffract, and absorb the modulated radio-frequency carrier signal.

A consequence of the presence of the signal-path impairments is that the radio receiver receives both direct-path and multipath images of the signal, which can cause infra-symbol and inter-symbol interference. The illustrative embodiments of the present invention are able to discriminate between direct-path and multipath images, which (substantially) prevents infra-symbol interference and enables the remediation of inter-symbol interference. Furthermore, the illustrative embodiments are also particularly effective remediating the effects of Doppler-shift impairments in the radio channel.

The illustrative embodiment of the present invention modulates the radio-frequency carrier signal with waveforms that are constructed to (substantially) prevent infra-symbol interference and enable the remediation of inter-symbol interference and Doppler-shift impairments.

As described in detail below, the nature of the waveforms is such that temporally-longer waveforms are better at preventing infra-symbol interference but introduce greater latency to the communications. Therefore, temporally-longer waveforms are less suitable for data items that are less latency tolerant (e.g., bi-directional voice communications, etc.) but more acceptable for data items that are high latency tolerant (e.g., broadcast uni-directional television, etc.). Temporally-longer waveforms are also advantageous as pilot signals and to discover the precise nature of the signal-path impairments.

In contrast, temporally-shorter waveforms are less effective in preventing infra-symbol interference but are more suitable for low latency tolerant data items. The illustrative embodiments of the present invention enables temporally-longer waveforms and temporally-shorter waveforms to be used concurrently in the same communications channel. This is advantageous for several reasons, including but not limited to, the ability of the telecommunications system to adapt on-the-fly the mix of longer and shorter waveforms based on the latency tolerance of the data items queued for transmission.

Furthermore, embodiments of the present invention enable a plurality of transmitters to simultaneously transmit (radiate) into the same radio channel to a single receiver in such a way that the receiver can separate the individual transmissions and properly associate them with their respective transmitters. This is widely called "multiple access" and is well known in other telecommunications systems (e.g., frequency-division multiple access, time-division multiple access, code-division multiple-access, etc.).

BRIEF DESCRIPTION OF THE DRAWINGS

FIG. 2$b$ depicts a flowchart of the salient tasks performed by base station 120, wireless terminal 130-1, and wireless terminal 130-2 in the performance of task 201.

FIG. 3 depicts a waveform array $\Phi1$ is based on M1 orthogonal M1-ary stepped-pulse waveforms.

FIG. 4$a$ depicts a plot of where the energy associated with waveform $\varphi1(1,1)$ of waveform array $\Phi1$ (M1=6, N1=4) beginning at superframe time interval 1 is deposited into a 10 MHz radio channel.

DETAILED DESCRIPTION

Figure 1A:
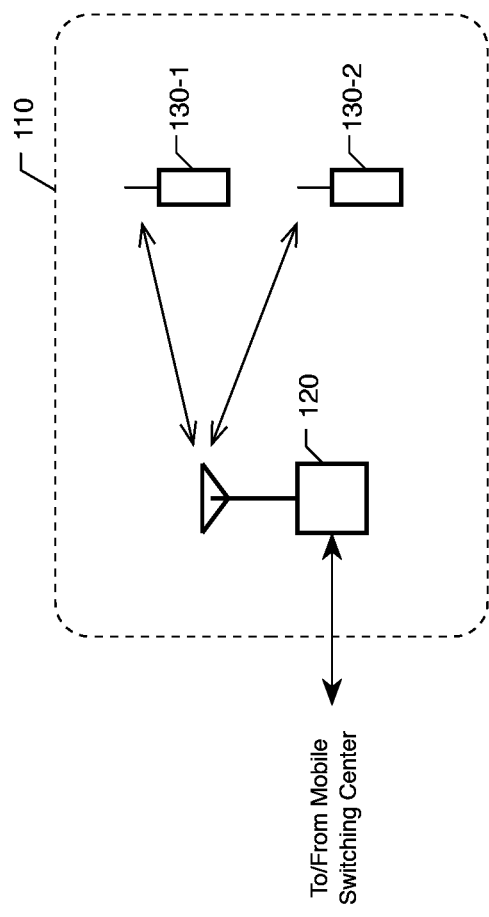
FIG. 1A depicts a block diagram of the salient components of wireless telecommunications system 100 in accordance with the illustrative embodiment of the present invention.

FIG. 1A depicts a block diagram of the salient components of wireless telecommunications system 100 in accordance with the illustrative embodiment of the present invention. Wireless telecommunications system 100 comprises: base station 120, wireless terminal 130-1, and wireless terminal 130-2, all of which are situated in geographic region 110.

In accordance with the illustrative embodiment, base station 120 provides bi-directional wireless telecommunications service to wireless terminal 130-1 and wireless terminal 130-2.

In accordance with the illustrative embodiment, base station 120 provides telecommunications service by exchanging "data items" with wireless terminal 130-1 and wireless terminal 130-2, which data items represent sound, images, video, data, and signaling. It will be clear to those skilled in the art how to make and use base station 120, wireless terminal 130, and wireless terminal 130-2 so that they can de-construct sound, images, video, data, and signaling into data items, and it will be clear to those skilled in the art how to make and use base station 120, wireless terminal 130, and wireless terminal 130-2 so that they can re-construct sound, images, video, data, and signaling from those data items.

In accordance with the illustrative embodiment, each data item is represented by a complex number that corresponds to one symbol in a 16 quadrature-amplitude ("16 QAM") signal constellation modulation scheme. It will be clear to those skilled in the art, however, after reading this disclosure, how to make and use alternative embodiments of the present invention in which each data item corresponds to a symbol in any digital modulation scheme (e.g., frequency-shift keying, amplitude-shift keying, phase-shift keying, etc.).

In accordance with the illustrative embodiment, wireless telecommunications system 100 comprises one base station and two wireless terminals, but it will be clear to those skilled in the art, after reading this disclosure, how to make and use alternative embodiments of the present invention that comprise any number of base stations and any number of wireless terminals. Furthermore, it will be clear to those skilled in the art how to partition the radio spectrum in an area into radio channels and to assign those channels to the base stations.

In accordance with the illustrative embodiment, base station 120 is stationary and terrestrial, but it will be clear to those skilled in the art, after reading this disclosure, how to make and use alternative embodiments of the present invention in which each base station 120 is mobile or airborne, or mobile and airborne.

In accordance with the illustrative embodiment, wireless terminal 130-1 and wireless terminal 130-2 are mobile, but it will be clear to those skilled in the art, after reading this disclosure, how to make and use alternative embodiments of the present invention in which each wireless terminal is either mobile or stationary.

In accordance with the illustrative embodiment, geographic region 110 comprises natural and man-made radio-frequency objects (not shown) that reflect, refract, and diffract the carrier signals that propagate between base station 120 and wireless terminal 130-1 and wireless terminal 130-2. Furthermore, some of the radio-frequency objects are stationary (e.g., trees, hills, buildings, etc.) and some are mobile (e.g., trucks, ships, airplanes, etc.).

In accordance with the illustrative embodiment, the parameters that characterize the signal-path impairments in the radio channel between base station 120 and wireless terminal 130-1 and wireless terminal 130-2 are dynamic (i.e., change with respect to time). It will be clear to those skilled in the art, after reading this disclosure, how to make and use embodiments of the present invention in which the characteristics of the radio channel and the nature of the signal-path impairments are static (i.e., do not change with respect to time).

In accordance with the illustrative embodiment, base station 120 and wireless terminal 130-1 and wireless terminal 130-2 exchange modulated radio-frequency carrier signals in a radio channel that is B=10 MHz wide. It will be clear to those skilled in the art, however, after reading this disclosure, how to make and use alternative embodiments of the present invention in which the radio channel has a different bandwidth (e.g., 2.5 MHz, 5.0 MHz, 12.5 MHz, 15 MHz, 20 MHz, 40 MHz, 80 MHz, etc.).

Figure 1B:
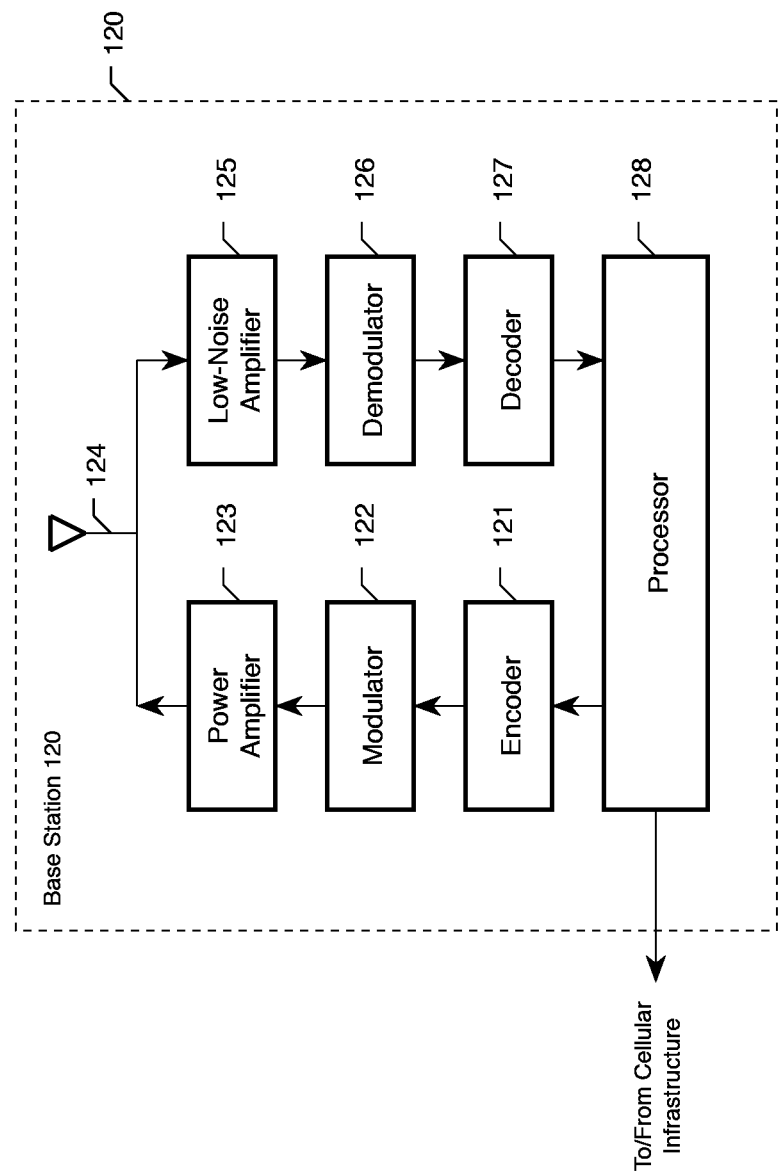
FIG. 1B depicts a block diagram of the salient components of base station 120 in accordance with the illustrative embodiment of the present invention.

FIG. 1B depicts a block diagram of the salient components of base station 120 in accordance with the illustrative embodiment of the present invention. Base station 120 comprises: encoder 121, modulator 122, power amplifier 123, and antenna 124, low-noise amplifier 125, demodulator 126, decoder 127, and processor 128.

Encoder 121 comprises the hardware and software necessary to compress, encrypt, and add forward error correction to the data items to be transmitted to wireless terminal 130-1 and wireless terminal 130-2. It will be clear to those skilled in the art how to make and use encoder 121.

Modulator 122 comprises the hardware and software necessary to modulate a radio-frequency carrier signal with the data items from encoder 121 to generate a modulated radio-frequency carrier signal. The construction and operation of modulator 122 is described in detail herein and in the accompanying figures.

Power amplifier 123 comprises the hardware necessary to increase the power of the modulated radio-frequency carrier signal for transmission via antenna 124. It will be clear to those skilled in the art how to make and use power amplifier 123.

Antenna 124 comprises the hardware necessary to facilitate the radiation of the modulated radio-frequency carrier signal wirelessly through space to wireless terminal 130-1 and wireless terminal 130-2. It will be clear to those skilled in the art how to make and use antenna 124.

Low-Noise amplifier 125 comprises the hardware necessary to increase the power of the modulated radio-frequency carrier signal received via antenna 124. It will be clear to those skilled in the art how to make and use low-noise amplifier 125.

Demodulator 126 comprises the hardware and software necessary to:
  i. demodulate the modulated radio-frequency carrier signal received by antenna 124, which is the sum of a first modulated radio-frequency carrier signal transmitted by wireless terminal 130-1 and a second modulated radio-frequency carrier signal transmitted by wireless terminal 130-2, and
  ii. recover one or more data items transmitted by wireless terminal 130-1 that are embodied in the modulated radio-frequency carrier signal and to associate those data items with wireless terminal 130-1, and
  iii. recover one or more data items transmitted by wireless terminal 130-2 that are embodied in the modulated radio-frequency carrier signal and to associate those data items with wireless terminal 130-2.

It will be clear to those skilled in the art, after reading this disclosure, how to make and use demodulator 126.

Decoder 127 comprises the hardware and software necessary to decompress, decrypt, and correct the data items transmitted by wireless terminal 130-1 and wireless terminal 130-2. It will be clear to those skilled in the art how to make and use decoder 127.

Processor 128 comprises the hardware and software necessary to operate base station 120 and to interface with the cellular infrastructure (not shown in FIG. 1B). It will be clear to those skilled in the art, after reading this disclosure, how to make and use processor 128.

Figure 1C:
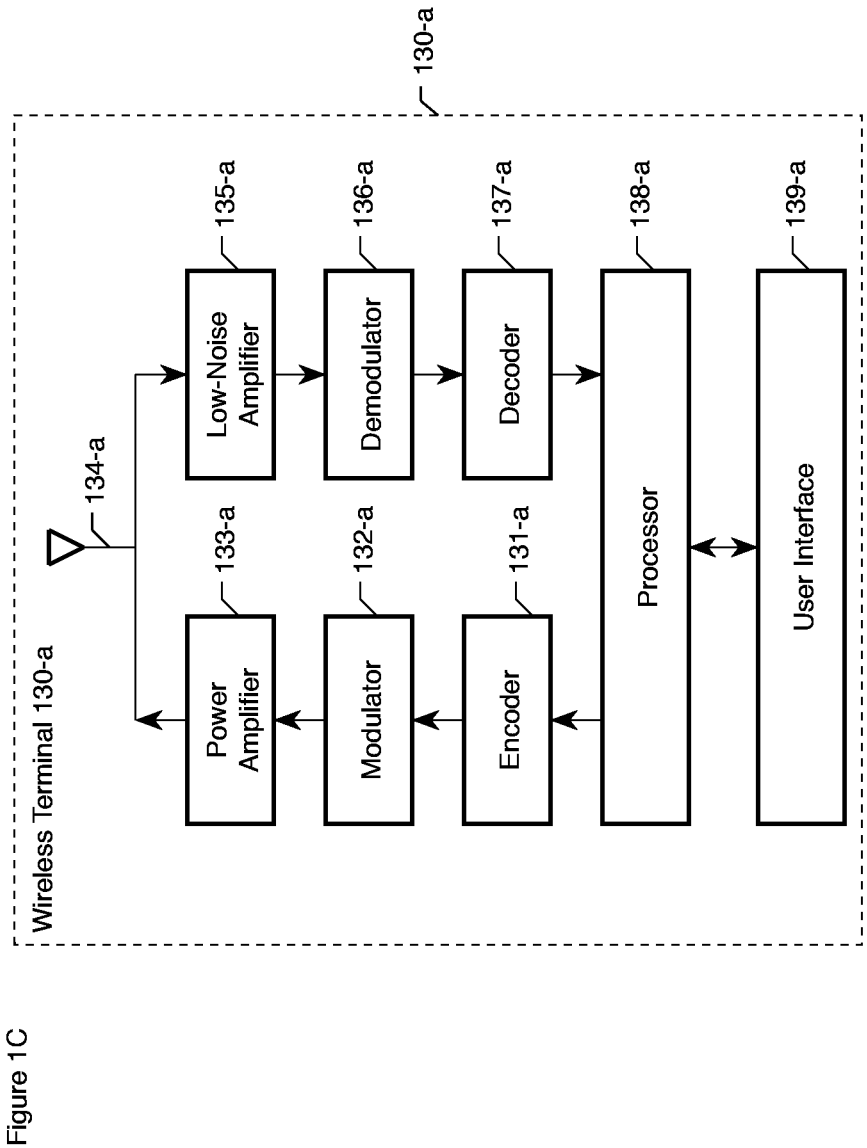
FIG. 1C depicts a block diagram of the salient components of wireless terminal 130-$a$, wherein $a \in \{1, 2\}$, in accordance with the illustrative embodiment of the present invention.

FIG. 1C depicts a block diagram of the salient components of wireless terminal 130-*a*, wherein a∈{1, 2}, in accordance with the illustrative embodiment of the present invention. Wireless terminal 130-*a* comprises: encoder 131-*a*, modulator 132-*a*, power amplifier 133-*a*, and antenna 134-*a*, low-noise amplifier 135-*a*, demodulator 136-*a*, decoder 137-*a*, processor 138-*a*, and user interface 139-*a*.

Encoder 131-*a* comprises the hardware and software necessary to compress, encrypt, and add forward error correction to the data items to be transmitted to base station 120. It will be clear to those skilled in the art how to make and use encoder 131-*a*.

Modulator 132-*a* comprises the hardware and software necessary to modulate a radio-frequency carrier signal with the data items from encoder 131-*a* to generate a modulated radio-frequency carrier signal. The construction and operation of modulator 132-*a* is described in detail herein and in the accompanying figures.

Power amplifier 133-*a* comprises the hardware necessary to increase the power of the modulated radio-frequency carrier signal for transmission via antenna 134-*a*. It will be clear to those skilled in the art how to make and use power amplifier 133-*a*.

Antenna 134-*a* comprises the hardware necessary to facilitate the radiation of the modulated radio-frequency carrier signal wirelessly through space to base station 120. It will be clear to those skilled in the art how to make and use antenna 134-*a*.

Low-Noise amplifier 135-*a* comprises the hardware necessary to increase the power of the modulated radio-frequency carrier signals received via antenna 134-*a*. It will be clear to those skilled in the art how to make and use low-noise amplifier 135-*a*.

Demodulator 136-*a* comprises the hardware and software necessary to demodulate a modulated radio-frequency carrier signal transmitted by base station 120 to recover the data items transmitted by base station 120. It will be clear to those skilled in the art, after reading this disclosure, how to make and use demodulator 136-*a*.

Decoder 137-*a* comprises the hardware and software necessary to decompress, decrypt, and correct the data items transmitted by base station 120. It will be clear to those skilled in the art how to make and use decoder 137-*a*.

Processor 138-*a* comprises the hardware and software necessary to operate wireless terminal 130-*a* and to interface with user interface 139-*a*. It will be clear to those skilled in the art, after reading this disclosure, how to make and use processor 138-*a*.

User interface 139-*a* comprises the hardware and software necessary to enable a user (not shown) to interact with wireless terminal 130-*a*. It will be clear to those skilled in the art how to make and use user interface 139-*a*.

Figure 2A:
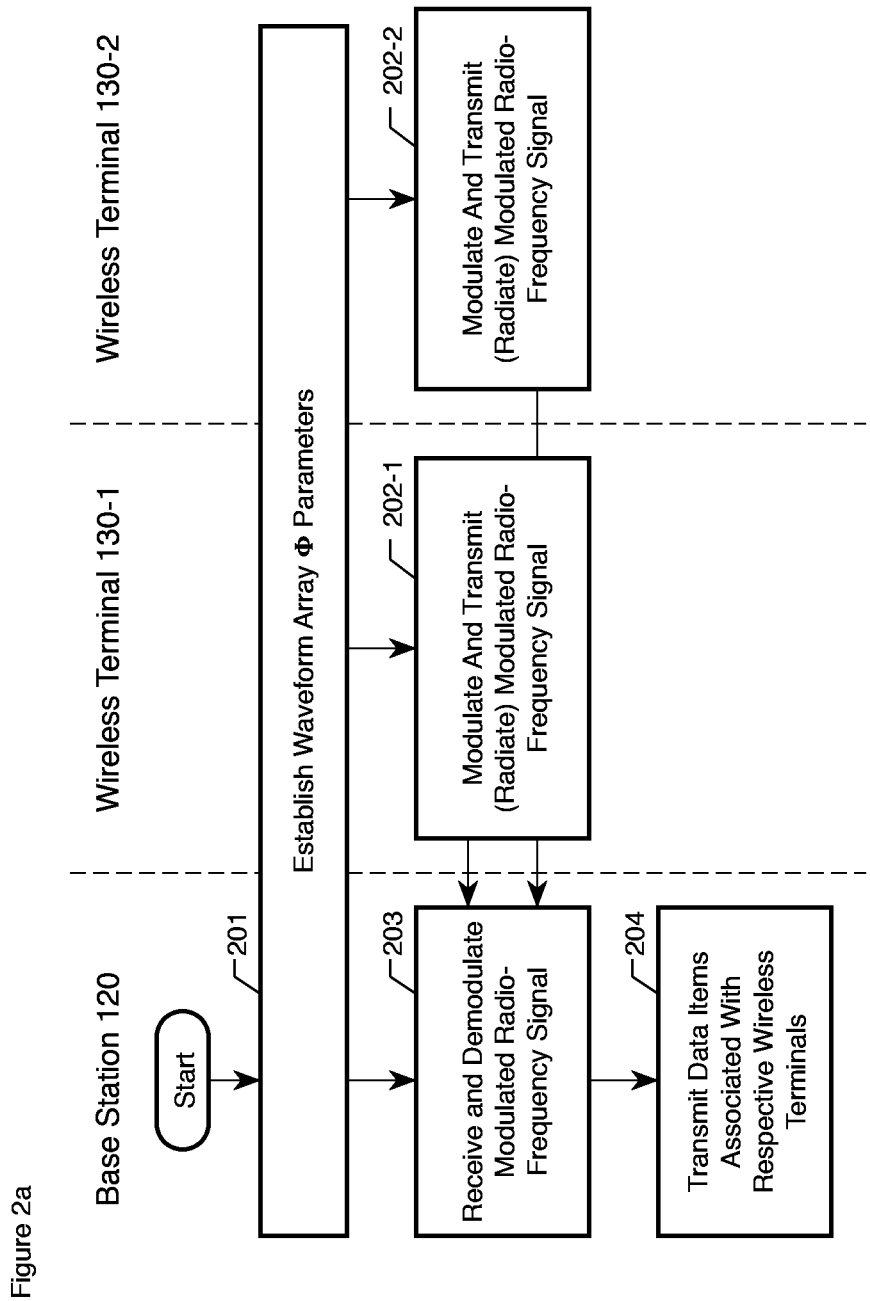
FIG. 2$a$ depicts a flowchart of the salient tasks performed by base station 120, wireless terminal 130-1, and wireless terminal 130-2 in accordance with the illustrative embodiment of the present invention.

FIG. 2*a* depicts a flowchart of the salient tasks performed by base station 120, wireless terminal 130-1, and wireless terminal 130-2 in accordance with the illustrative embodiment of the present invention.

At task 201, base station 120, wireless terminal 130-1, and wireless terminal 130-2 establish the parameters of two non-identical waveform arrays—waveform arrays $\Phi 1$ and $\Phi 2$—with which they will communicate. In accordance with the illustrative embodiment, base station 120, wireless terminal 130-1, and wireless terminal 130-2 establish the parameters of two non-identical waveforms arrays but it will be clear to those skilled in the art, after reading this disclosure, how to make and use alternative embodiments of the present invention that establish the parameters of any number (e.g., three, four, six, eight, twelve, sixteen, thirty-two, sixty-four, etc.) of non-identical waveform arrays. Task 201 is described in detail below and in the accompanying figures.

At task 202, wireless terminal 130-1 and wireless terminal 130-2 each transmit (radiate) a modulated radio-frequency carrier signal in a radio channel to base station 120 in accordance with the parameters of waveform arrays $\Phi 1$ and $\Phi 2$. Task 202 is described in detail below and in the accompanying figures.

At task 203, base station 120 receives a radio-frequency signal from the radio channel that is a sum of:
  1. the modulated radio-frequency carrier signal radiated by wireless terminal 130-1, plus
  2. the multipath images (if any) of the modulated radio-frequency carrier signal radiated by wireless terminal 130-1, plus
  3. the modulated radio-frequency carrier signal radiated by wireless terminal 130-2, plus 4. the multipath images (if any) of the modulated radio-frequency carrier signal radiated by wireless terminal 130-2, plus
5. noise.

As part of task 203, base station 120 demodulates and decodes the radio-frequency signal to recover one or more data items transmitted by wireless terminal 130-1 (and to associate those data items with wireless terminal 130-1) and one or more data items transmitted by wireless terminal 130-2 (and to associate those data items with wireless terminal 130-2). It will be clear to those skilled in the art, after reading this disclosure, how to make and use base station 120 to be able to perform task 230.

At task 204, base station 120 transmits one or more data items associated with wireless terminal 130-1 and one or more data items associated with wireless terminal 130-2 to the cellular infrastructure (e.g., a mobile switching center, etc.), which is not shown in FIG. 1B.

Figure 2B:
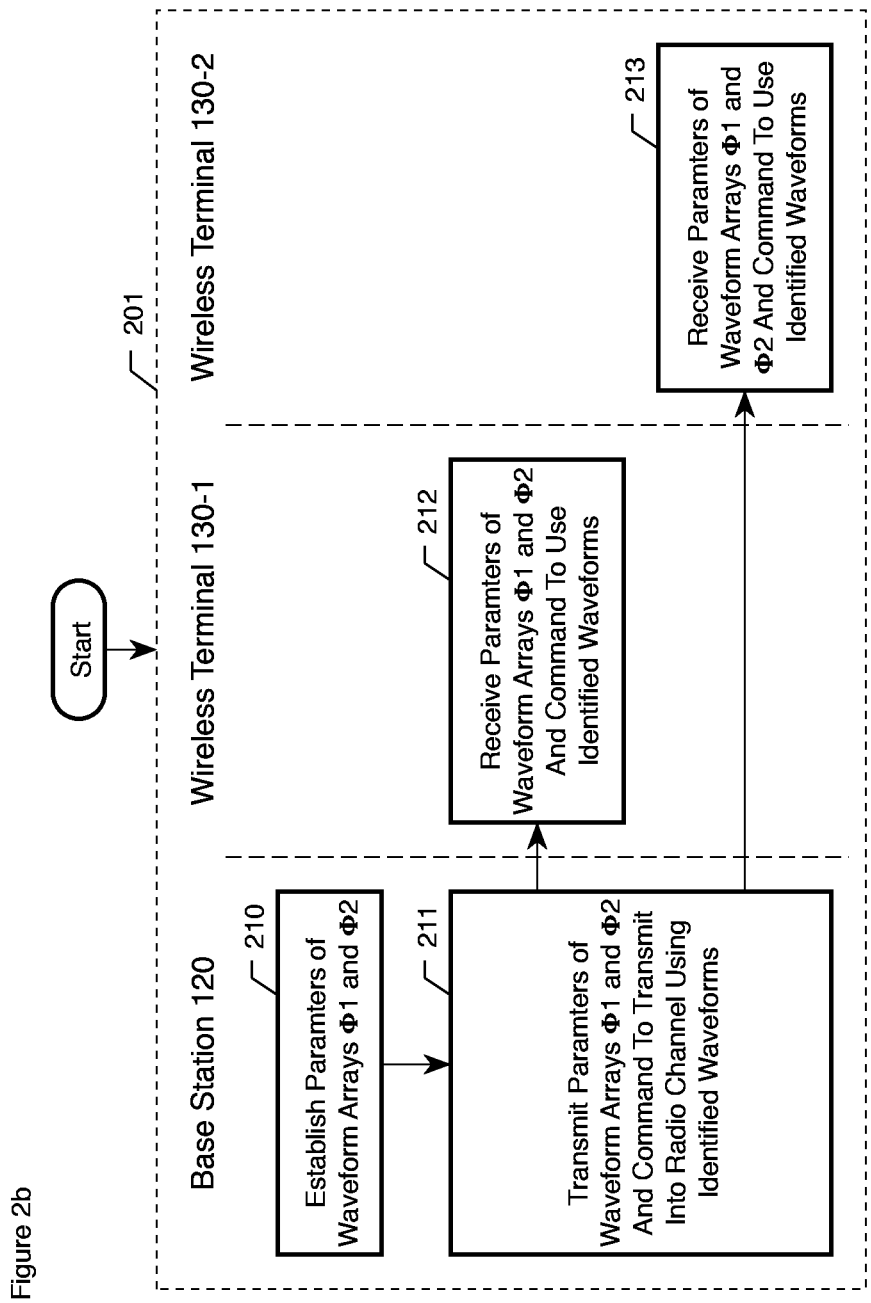

FIG. 2b depicts a flowchart of the salient tasks performed by base station 120, wireless terminal 130-1, and wireless terminal 130-2 in the performance of task 201. As part of task 120, the parameters of waveform arrays Φ1 and Φ2 are chosen to:
  i. mitigate infra-symbol interference caused by Doppler-shift and multipath interference in the radio channel, and
  ii. enable simultaneous multiple access by both wireless terminal 130-1 and wireless terminal 130-2 to base station 120, and
  iii. enable wireless terminal 130-1 to transmit waveforms of waveform arrays Φ1 and Φ2 into the radio channel at the same time (i.e., concurrently) while wireless terminal 130-2 transmits different waveforms of waveform arrays Φ1 and Φ2 into the same radio channel.

At task 210, and as is described in detail below, each waveform array Φj is characterized by two parameters Mj and Nj, wherein Mj and Nj are a positive integers greater than one and j∈{1, 2} (i.e., waveform array Φ1 is characterized by parameters M1 and N1 and waveform array Φ2 is characterized by parameters M2 and N2).

In accordance with the first illustrative embodiment, M1=M2=6, N1=4, and N2=8 (i.e., M1=M2 and N1≠N2). In accordance with the second illustrative embodiment, M1=16, M2=32, and N1=N2=8 (i.e., M1≠M2 and N1=N2). In accordance with the third illustrative embodiment, M1=16, M2=32, N1=32, and N2=8 (i.e., M1≠M2 and N1≠N2). In all three illustrative embodiments, M1·N1≠M2·N2.

It will be clear to those skilled in the art, after reading this disclosure, how to make and use alternative embodiments of the present invention with any combination of values of M1, M2, N1, and N2. Furthermore, it will be clear to those skilled in the art, after reading this disclosure, that embodiments of the present invention are typically simplified and more efficient by making M2 an integral multiple of M1 (e.g., 2×, 3×, 4×, 5×, 6×, 8×, 12×, 16×, 32×, 64×, 128×, etc.). And still furthermore, it will be clear to those skilled in the art, after reading this disclosure, that embodiments of the present invention are typically simplified and more efficient by making N2 an integral multiple of N1 (e.g., 2×, 3×, 4×, 5×, 6×, 8×, 12×, 16×, 32×, 64×, 128×, etc.).

In accordance with the illustrative embodiment, the parameters of waveform arrays Φ1 and Φ2 are established once when base station 120, wireless terminal 130-1, and wireless terminal 130-2 first establish communication, but it will be clear to those skilled in the art, after reading this disclosure, how to make and use alternative embodiments of the present invention in which base station 120, wireless terminal 130-1, and wireless terminal 130-2 periodically or sporadically re-establish the parameters of waveform array Φ1 or waveform array Φ2 or waveform arrays Φ1 and Φ2. For example and without limitation, base station 120, wireless terminal 130-1, and wireless terminal 130-2 can re-establish the parameters of waveform arrays Φ1 and Φ2 when:
  i. the traits of the signal path from change, or
  ii. the type of data represented by the data items changes, or
  iii. the latency tolerance of the data items changes, or
  iv. any combination of i, ii, and iii.

As is described in detail below, waveform arrays Φ1 and Φ2 comprise waveforms that convey data items from wireless terminal 130-1 or wireless terminal 130-2 to base station 120. In accordance with the illustrative embodiment, wireless terminal 130-1 and wireless terminal 130-2 convey low-latency tolerant data items using waveform array Φ1 and high-latency tolerant data items using waveform array Φ2. It will be clear to those skilled in the art, after reading this disclosure, how to make and use alternative embodiments of the present invention in which wireless terminal 130-1 and wireless terminal 130-2 use the waveforms in different waveform arrays for:
  i. different conditions of the signal path from wireless terminal 130-1 or wireless terminal 130-2 to base station 120, or
  ii. different types of data items, or
  iii. different latency tolerance of the data items, or
  iv. any combination of i, ii, and iii.

Basic Waveforms—

Waveform array Φj is based on an extension of Mj basic waveforms bj(1), . . . , bj(mj), . . . , bj(Mj) that are orthogonal in Mj-dimensional vector space, where Mj is a positive integer greater than 1, and mj is a positive integer in the range mj∈{1, . . . , Mj}.

In accordance with all of the illustrative embodiments, basic waveform bj(mj) is waveform mj of a Mj-ary stepped-pulse waveform scheme, as depicted in FIG. 3. In accordance with all of the illustrative embodiments, each pulse is a band-limited raised-cosine pulse but it will be clear to those skilled in the art, after reading this disclosure, how to make and use alternative embodiments of the present invention in which each pulse has a different shape.

Each pulse in basic waveform bj(mj) is band-limited, and, therefore, the duration of each pulse is 1/B seconds, wherein B is the bandwidth of the channel. Furthermore, the centers of adjacent pulses are separated by 1/B seconds. And still furthermore, the total duration of each basic waveform bj(mj) is Mj/B seconds.

Although all of the illustrative embodiments uses stepped-pulse waveforms as the basic waveforms, it will be clear to those skilled in the art, however, after reading this disclosure, how to make and use alternative embodiments of the present invention in which waveform array Φj is based on any set of Mj orthogonal waveforms, bj(1), . . . , bj(Mj).

Structure of Waveform Array Φ—

Waveform array Φj comprises Mj·Nj waveforms that are orthogonal in Mj·Nj-dimensional vector space. The Mj·Nj waveforms of waveform array Φj are denoted φj(1,1), . . . , φj(mj,nj), . . . , φj(Mj,Nj), where nj is a positive integer in the range nj∈{1, . . . , Nj}.

Each waveform φj(mj,nj) is the sum of Nj waveforms yj(mj,nj,1), . . . , yj(mj,nj,pj), . . . , yj(mj,nj,Nj).

Each waveform φj(mj,nj) is identically partitioned into Nj time slots 1, . . . , pj, . . . , Nj, where pj is a positive integer in the range pj∈{1, . . . , Nj}. Waveform yj(mj,nj,pj) occupies time slot pj in waveform φj(mj,pj) and equals:

$$yj(mj,nj,pj)=bj(mj)\cdot u(nj,pj) \quad (\text{Eq. 1})$$

wherein $u(nj,pj)$ is a phasor that equals:

$$u(nj,pj)=\exp(2\pi(nj-1)(pj-1)i/Nj) \quad (\text{Eq. 2})$$

The duration of waveform φ(mj,nj,pj) defines the duration of time slot pj.

The Mj·Nj waveforms of waveform array Φj partition the time-frequency space of the modulated radio-frequency carrier signal into 1/B second-long "time intervals" and Mj·Nj "frequency sub-bands." Each waveform array Φj constitutes a "frame" of Mj·Nj time intervals, and the least common multiple of Mj·Nj for all j (e.g., the LCM(M1·N1, M2·N2) for j∈{1, 2}) constitutes a "superframe" of time intervals. The temporal start of each waveform is specified relative to the first time interval in the superframe.

A salient characteristic of the illustrative embodiment is that each waveform φj(mj,nj) in waveform array Φj deposits energy into:
  i. unique time-frequency portions the radio channel, and
  ii. 1/Mj·Nj$^{th}$ of the radio channel during the frame of waveform array Φj.

Figure 4B:
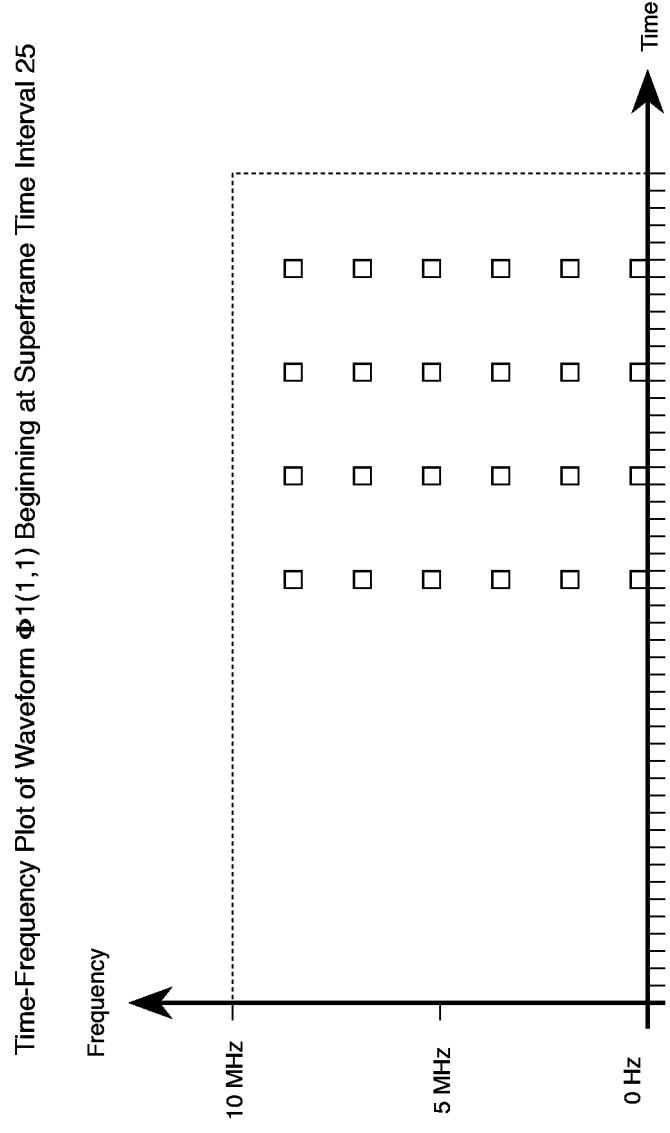
FIG. 4b depicts a plot of where the energy associated with waveform φ1(1,1) of waveform array Φ1 (M1=6, N1=4) beginning at superframe time interval 25 is deposited into a 10 MHz radio channel.
Figure 4C:
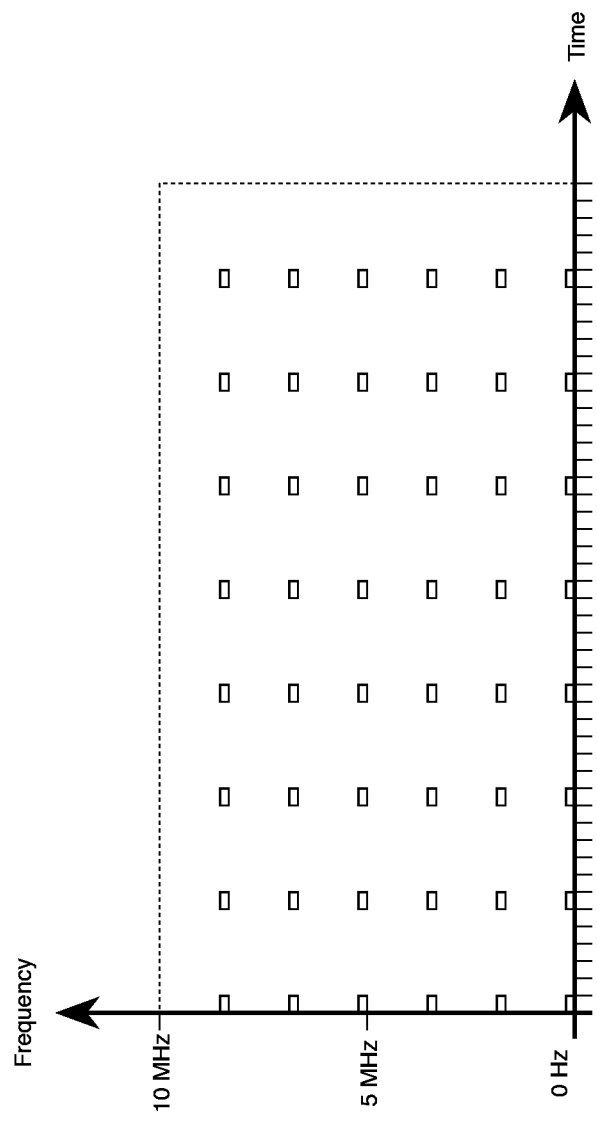
FIG. 4c depicts a plot of where the energy associated with waveform φ2(1,1) of waveform array Φ2 (M2=6, N2=8) beginning at superframe time interval 1 is deposited into a 10 MHz radio channel.

This is illustrated in FIGS. 4a, 4b, and 4c for waveform array Φ1 (M1=6, N1=4) and waveform array Φ2 (M2=6, N2=8).

For example, FIG. 4a depicts a plot of where the energy associated with waveform φ1(1,1) of waveform array Φ1 (M1=6, N1=4) beginning at superframe time interval 1 is deposited into a 10 MHz radio channel. In FIG. 4a the radio channel is depicted as divided into twenty-four (M1·N1=24) 416.66 KHz frequency sub-bands (B=10 MHz/M1·N1=24) and forty-eight [LCM(M1·N1, M2·N2)=24] 0.1 microsecond (1/B=10 MHz) time intervals. In FIG. 4a, it can be seen that energy is deposited only in time intervals 1, 7, 13, and 19 and only in the frequency sub-bands 0-0.416 MHz, 1.666-2.083 MHz, 3.333-3.750 MHz, 5.000-5.417 MHz, 6.666-7.083 MHz, and 8.333-8.750 MHz in the channel.

FIG. 4b depicts a plot of where the energy associated with waveform φ1(1,1) of waveform array Φ1 (M1=6, N1=4) beginning at superframe time interval 25 is deposited into a 10 MHz radio channel. In FIG. 4a the radio channel is depicted as divided into twenty-four (M1·N1=24) 416.66 KHz frequency sub-bands (B=10 MHz/M1·N1=24) and forty-eight [LCM(M1·N1, M2·N2)=24] 0.1 microsecond (1/B=10 MHz) time intervals. In FIG. 4b, it can be seen that energy is deposited only in time intervals 25, 31, 37, and 43 and only in the frequency sub-bands 0-0.416 MHz, 1.666-2.083 MHz, 3.333-3.750 MHz, 5.000-5.417 MHz, 6.666-7.083 MHz, and 8.333-8.750 MHz in the channel.

Similarly, FIG. 4c depicts a plot of where the energy associated with waveform φ2(1,1) of waveform array Φ2 (M2=6, N2=8) beginning at superframe time interval 1 is deposited into a 10 MHz radio channel. In FIG. 4a the radio channel is depicted as divided into twenty-four (M1·N1=24) 416.66 KHz frequency sub-bands (B=10 MHz/M1·N1=24) and forty-eight [LCM(M1·N1, M2·N2)=24] 0.1 microsecond (1/B=10 MHz) time intervals. In FIG. 4c, it can be seen that energy is deposited only in time intervals 1, 7, 13, 19, 25, 31, 37, and 43 and only in the frequency sub-bands 0-0.208 MHz, 1.666-1.875 MHz, 3.333-3.541 MHz, 5.000-5.208 MHz, 6.666-6.875 MHz, and 8.333-8.541 MHz in the channel.

It will be clear to those skilled in the art how to determine when and where any given waveform φj(mj,nj) will deposit energy into a radio channel using Fourier analysis in well-known fashion.

In accordance with the illustrative embodiment, base station 120 selects individual waveforms from waveform arrays Φ1 and Φ2 to convey data items from wireless terminal 130-1 and wireless terminal 130-2, and selects those waveforms so that:
  I. no two waveforms overlap the time-frequency space of the modulated radio-frequency carrier signal (to prevent inter-symbol interference), and
  II. all of the time-frequency space of the modulated radio-frequency carrier signal has energy deposited into it (to maximize spectral efficiency), and
  III. waveforms from waveform array Φ1 convey data items with low-latency tolerance and waveforms from waveform array Φ2 convey data items with high-latency tolerance.

To accomplish this, base station 120 instructs wireless terminal 130-1 and wireless terminal 130-2 how to transmit waveforms from waveform array Φ1 and waveforms from waveform array Φ2 into the same channel at the same time with satisfactory guard waveforms (i.e., how to transmit waveforms from waveform array Φ1 and waveforms from waveform array Φ2 so that they:
  1. overlap in the 4.8 microsecond superframe "time space" of the radio channel, and
  2. overlap in the 10 MHz "frequency space" of the radio channel, and
  3. do not overlap in the "time-frequency space" of the radio channel.

For example, FIGS. 5a, 5b, 5c, 5d, 5e, and 5f depict waveforms in which waveforms from waveform arrays Φ1(M1=6, N1=4) and Φ2(M2=6, N2=8) are either exclusively:
  1. assigned to base station 130-1 to transmit data items to base station 120, or
  2. assigned to base station 130-2 to transmit data items to base station 120, or
  3. reserved as guard waveforms (and not transmitted by either base station 130-1 or base station 130-2.

Figure 5A:
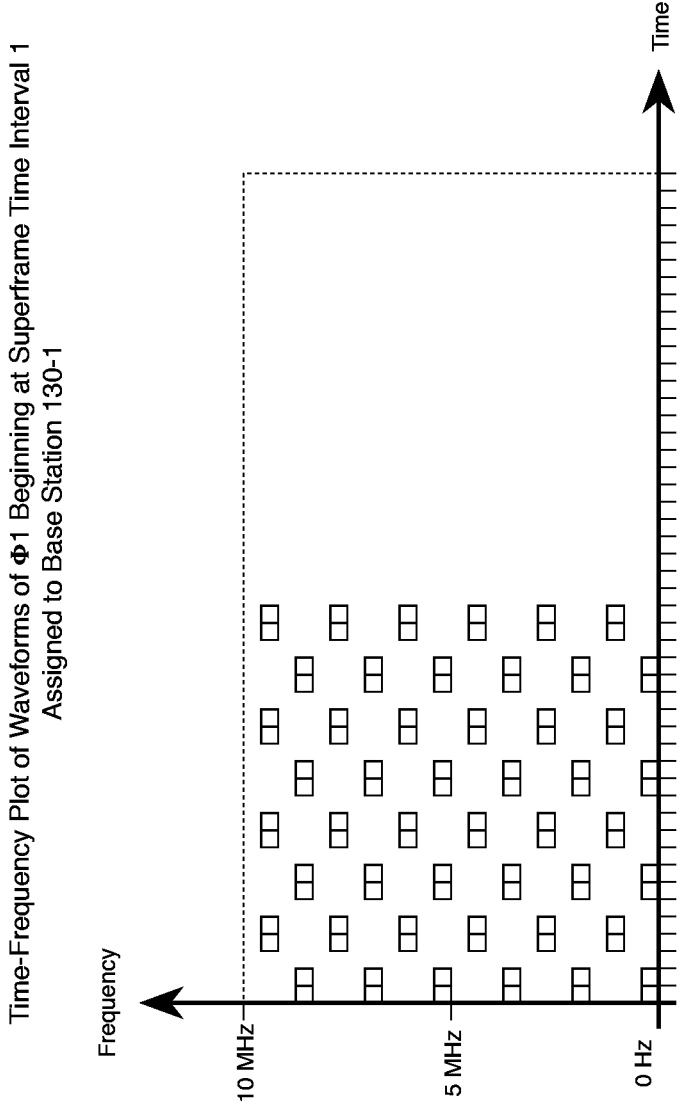
FIG. 5a depicts a plot of where the energy associated with all of the waveforms from waveform arrays Φ1 assigned to base station 130-1 is deposited beginning at superframe time interval 1.
Figure 5B:
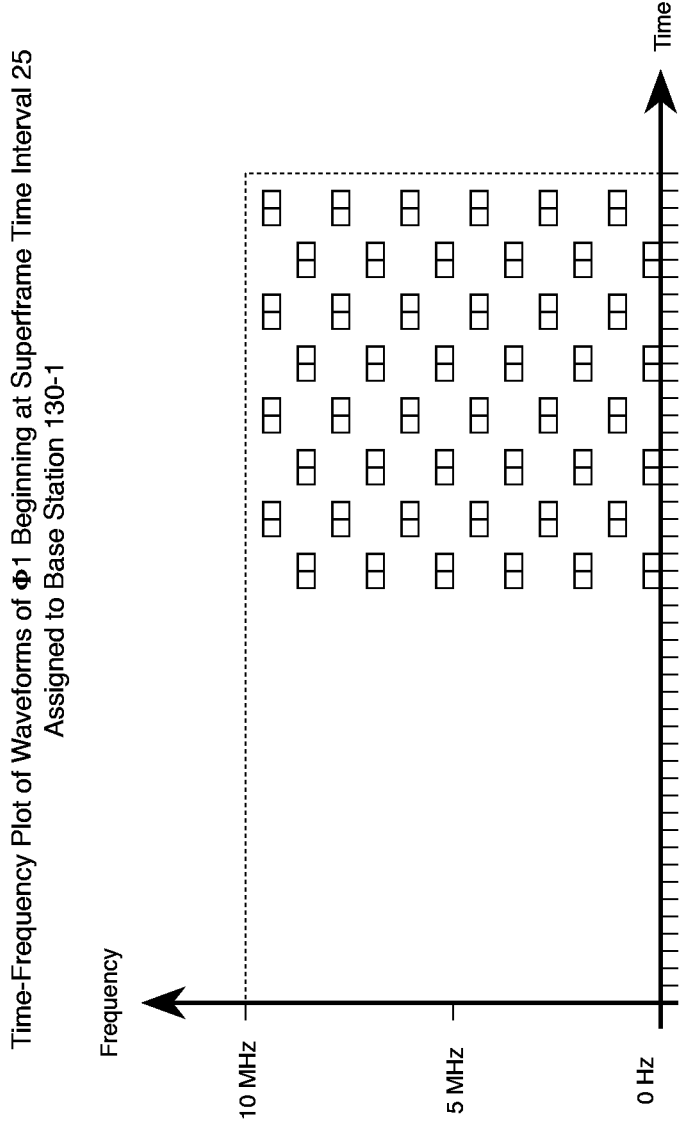
FIG. 5b depicts a plot of where the energy associated with all of the waveforms from waveform arrays Φ1 assigned to base station 130-1 is deposited beginning at superframe time interval 25.

Base station 130-1 is assigned four waveforms from waveform array Φ1 beginning at superframe time interval 1 and superframe time interval 25, as shown in Table 1 and as depicted in FIGS. 5a and 5b, respectively.

TABLE 1

Waveforms from Waveform Array Φ1 Assigned to Base Station 130-1

| Conveying Waveform | Beginning Superframe Time Interval |
|---|---|
| φ1(1,1) | 1, 25 |
| φ1(1,2) | 1, 25 |
| φ1(4,3) | 1, 25 |
| φ1(5,3) | 1, 25 |

Figure 5C:
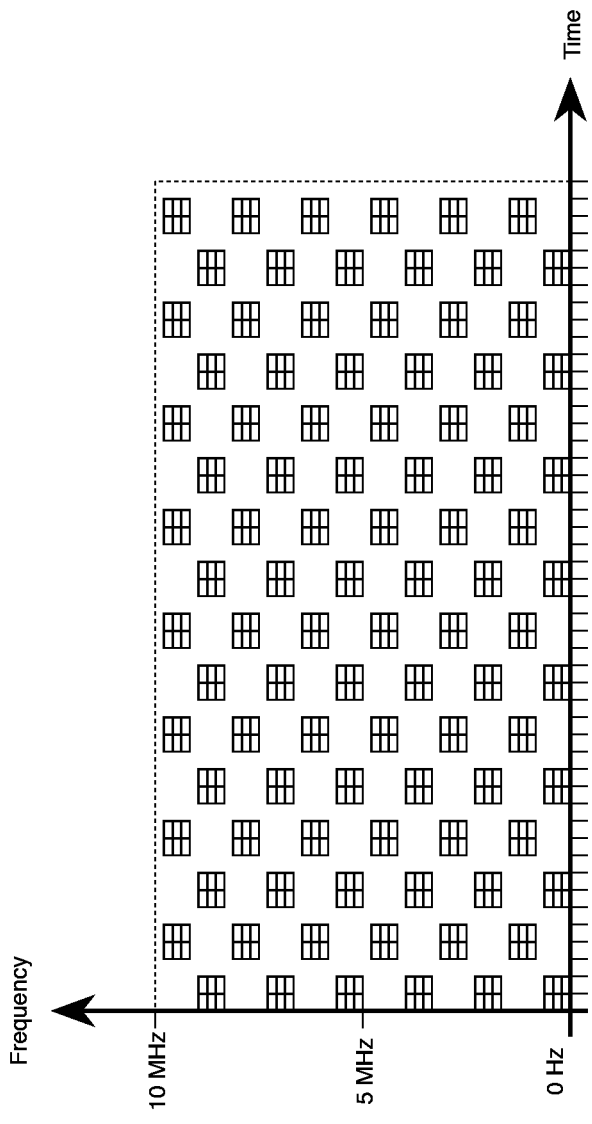
FIG. 5c depicts a plot of where the energy associated with all of the waveforms from waveform arrays Φ2 assigned to base station 130-1 is deposited beginning at superframe time interval 1.

Base station 130-1 is also assigned twelve waveforms from waveform array Φ2 beginning at superframe time interval 1, as shown in Table 2 and as depicted in FIG. 5c.

TABLE 2

Waveforms from Waveform Array Φ2 Assigned to Base Station 130-1

| Conveying Waveform | Beginning Superframe Time Interval |
|---|---|
| φ2(1,1) | 1 |
| φ2(1,2) | 1 |
| φ2(1,3) | 1 |

TABLE 2-continued

Waveforms from Waveform Array Φ2 Assigned to Base Station 130-1

| Conveying Waveform | Beginning Superframe Time Interval |
|---|---|
| φ2(2,1) | 1 |
| φ2(2,3) | 1 |
| φ2(2,4) | 1 |
| φ2(4,5) | 1 |
| φ2(4,6) | 1 |
| φ2(4,7) | 1 |
| φ2(5,5) | 1 |
| φ2(5,6) | 1 |
| φ2(5,7) | 1 |

It will be clear to those skilled in the art, after reading this disclosure, that base station 130-1 can transmit (in a single superframe) only those combinations of waveforms assigned to it that do not interfere with each other (i.e., do not put energy into the same "time-frequency space" of the radio channel). Furthermore, it will be clear to those skilled in the art, after reading this disclosure, which combinations of waveforms can be transmitted (in a single superframe) so as to not interfere with each other.

Figure 5D:
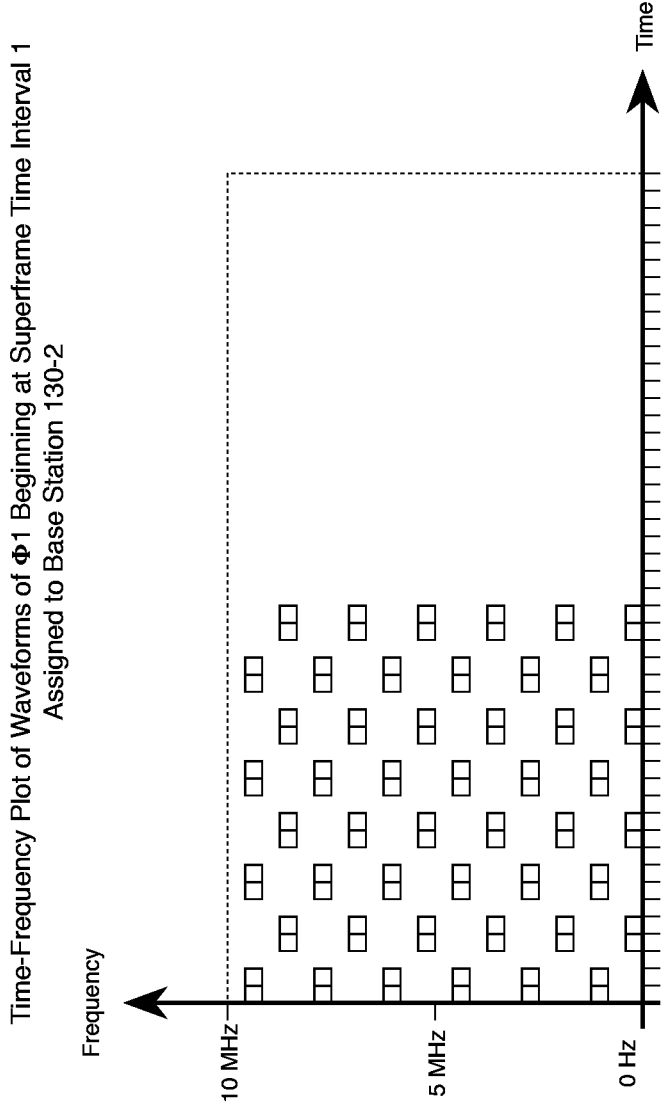
FIG. 5d depicts a plot of where the energy associated with all of the waveforms from waveform arrays Φ1 assigned to base station 130-2 is deposited beginning at superframe time interval 1.
Figure 5E:
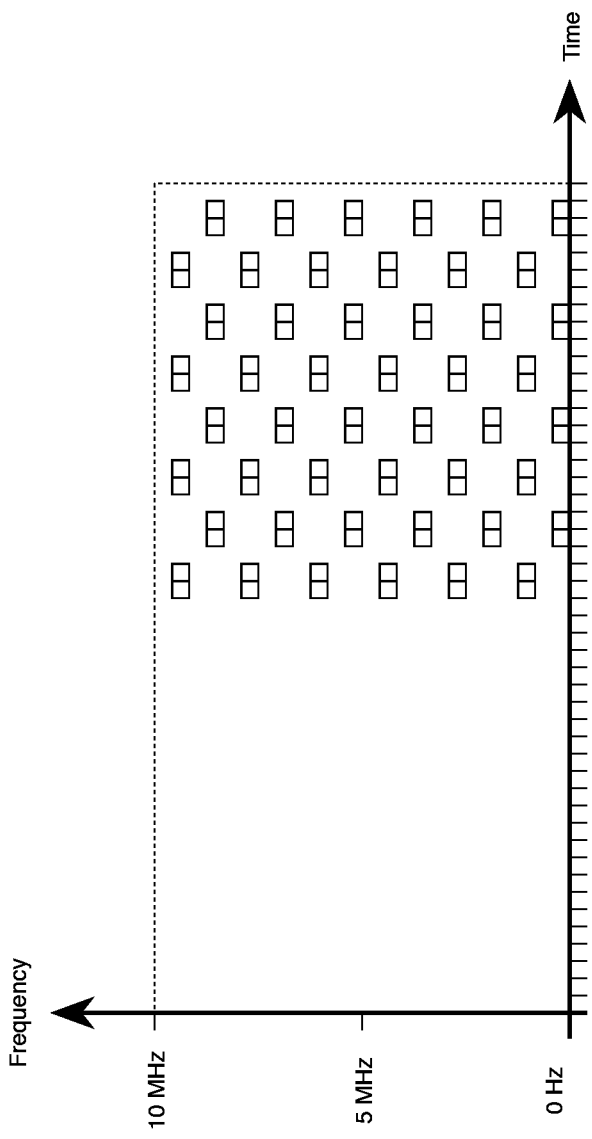
FIG. 5e depicts a plot of where the energy associated with all of the waveforms from waveform arrays Φ1 assigned to base station 130-2 is deposited beginning at superframe time interval 25.

Base station 130-2 is assigned four waveforms from waveform array Φ1 beginning at superframe time interval 1 and superframe time interval 25, as shown in Table 3 and as depicted in FIGS. 5d and 5e, respectively.

TABLE 3

Waveforms from Waveform Array Φ1 Assigned to Base Station 130-2

| Conveying Waveform | Beginning Superframe Time Interval |
|---|---|
| φ1(1,3) | 1, 25 |
| φ1(2,3) | 1, 25 |
| φ1(4,1) | 1, 25 |
| φ1(5,1) | 1, 25 |

Figure 5F:
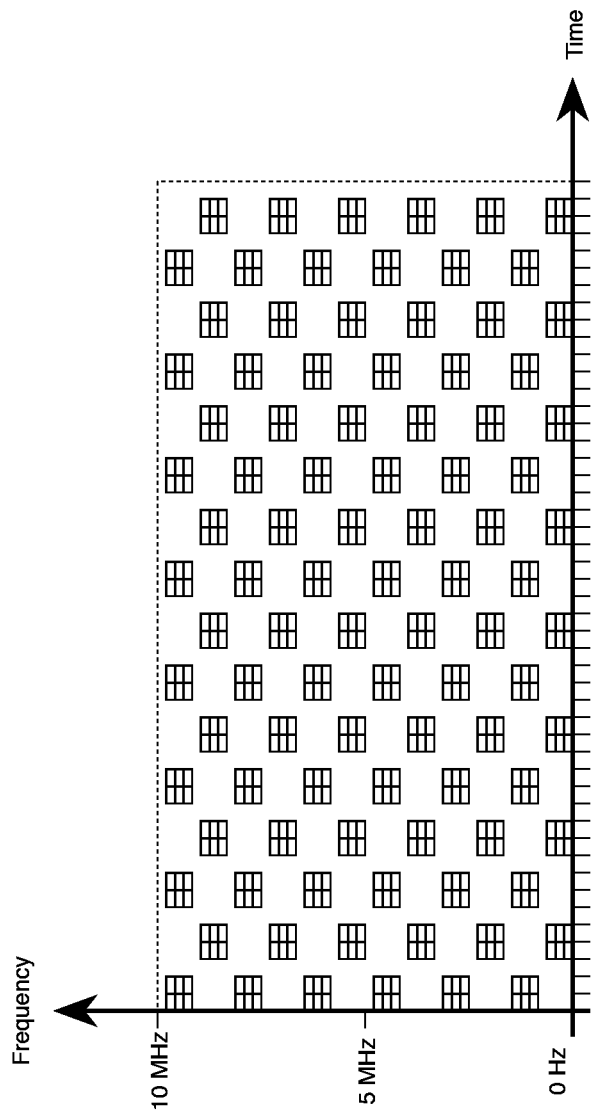
FIG. 5f depicts a plot of where the energy associated with all of the waveforms from waveform arrays Φ2 assigned to base station 130-2 is deposited beginning at superframe time interval 1.

Base station 130-2 is also assigned twelve waveforms from waveform array Φ2 beginning at superframe time interval 1, as shown in Table 4 and as depicted in FIG. 5f.

TABLE 4

Waveforms from Waveform Array Φ2 Assigned to Base Station 130-2

| Conveying Waveform | Beginning Superframe Time Interval |
|---|---|
| φ2(1,5) | 1 |
| φ2(1,6) | 1 |
| φ2(1,7) | 1 |
| φ2(2,5) | 1 |
| φ2(2,6) | 1 |
| φ2(2,7) | 1 |
| φ2(4,1) | 1 |
| φ2(4,2) | 1 |
| φ2(4,3) | 1 |
| φ2(5,1) | 1 |
| φ2(5,2) | 1 |
| φ2(5,3) | 1 |

It will be clear to those skilled in the art, after reading this disclosure, that base station 130-1 can transmit (in a single superframe) only those combinations of waveforms assigned to it that do not interfere with each other (i.e., do not put energy into the same "time-frequency space" of the radio channel). Furthermore, it will be clear to those skilled in the art, after reading this disclosure, which combinations of waveforms can be transmitted (in a single superframe) so as to not interfere with each other.

The remaining waveforms—which were not assigned to either base station 130-1 or base station 130-2—are reserved as guard waveforms in order to reduce inter-symbol interference from multi-path images and Doppler shifts.

It will be clear to those skilled in the art, after reading this disclosure, how to make and use alternative embodiments of the present invention that assign any combination of waveforms for conveying data items and any combination of waveforms for use as guard waveforms. Furthermore, it will be clear to those skilled in the art, after reading this disclosure, how to partition the waveforms in waveform array Φ among any number of wireless terminals and guard waveforms.

At task 211, base station 120 transmits the waveform array Φ parameters to wireless terminal 130-1 and wireless terminal 130-2 along with a command to transmit into the radio channel using the assigned waveforms.

At task 212, wireless terminal 130-1 receives the waveform array Φ parameters and the command to use the waveforms assigned to it.

At task 213, wireless terminal 130-2 receives the waveform array Φ parameters and the command to use the waveforms assigned to it.

Figure 6:
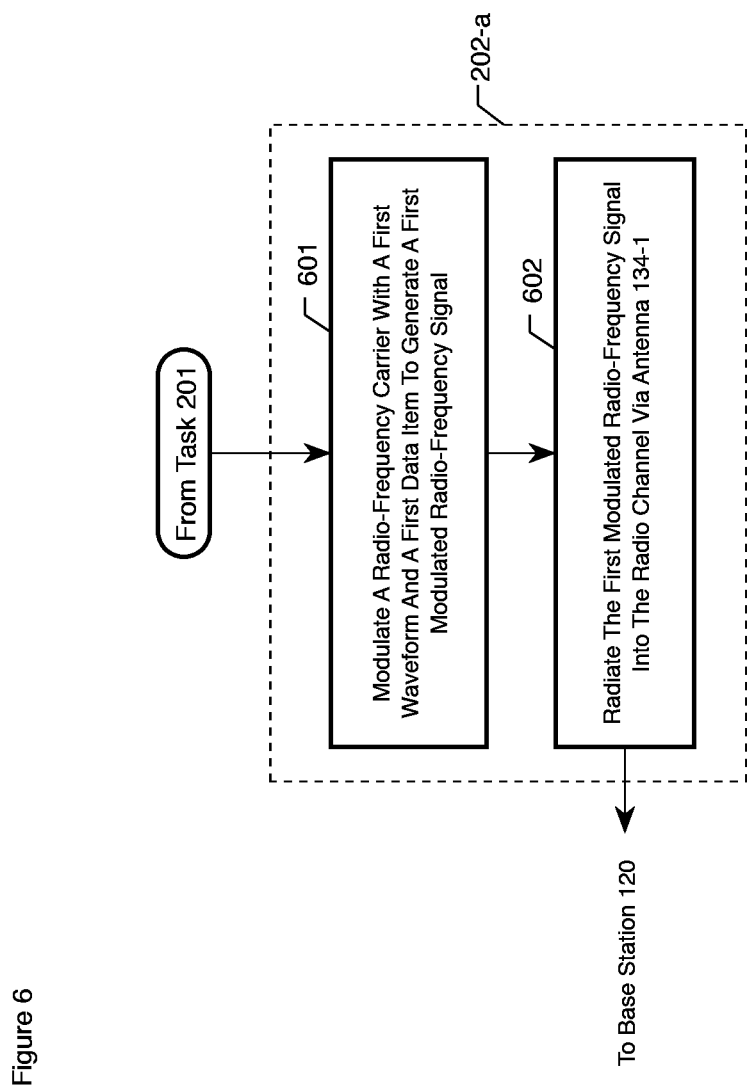
FIG. 6 depicts a flowchart of the salient tasks associated with task 202-a, wherein a∈{1, 2}, in accordance with the illustrative embodiment of the present invention.

FIG. 6 depicts a flowchart of the salient tasks associated with task 202-a, wherein a∈{1, 2}, in accordance with the illustrative embodiment of the present invention.

At task 1601, wireless terminal 130-a establishes a one-to-one relationship between each data item it will transmit to base station 120 and each waveform Φ(m,n) in waveform array Φ that has been assigned to it. As part of task 1601, wireless terminal 130-a modulates a radio-frequency carrier signal with each waveform assigned to it and the corresponding data item to generate a modulated radio-frequency carrier signal. It will be clear to those skilled in the art, after reading this disclosure, how to make and use embodiments of the present invention that perform task 1601.

At task 1602, the modulated radio-frequency carrier signal is radiated into the radio channel via antenna 134-a for reception by base station 120. It will be clear to those skilled in the art, after reading this disclosure, how to make and use embodiments of the present invention that perform task 1602.

Markman Definitions

Orthogonal—For the purpose of this specification, two waveforms are orthogonal if their inner product is zero over the time interval of interest.

Identical Waveform Arrays—For the purposes of this specification, waveform array Φ1(M1, N1) and waveform array Φ2(M2, N2) are identical if M1=M2 and N1=N2.

Non-identical Waveform Arrays—For the purposes of this specification, waveform array Φ1(M1, N1) and waveform array Φ2(M2, N2) are non-identical if they are not identical.

What is claimed is:

1. A base station apparatus, comprising:
a processor configured to:
transmit:
(a) a first command to a first wireless terminal to transmit, into a radio channel during a frame, a first modulated radio-frequency carrier signal that is modulated with a first waveform φ(1,1) and a first data item d(1,1), and
(b) a second command to a second wireless terminal to transmit, into the radio channel during the frame, a second modulated radio-frequency carrier signal that is modulated with a second waveform φ(M,1) and a second data item d(M,1),
wherein:
(i) the waveform φ(m,n) is partitioned into N time slots 1, . . . , p, . . . , N,
(ii) time slot p of the waveform φ(m,n) comprises a basic waveform b(m) multiplied by exp[2π(n−1)(p−1)i/N],
(iii) the first waveform φ(1,1) is multiplied by the first data item d(1,1), and the second waveform φ(M,1) is multiplied by the second data item d(M,1),
(iv) M and N are positive integers greater than 1,
(v) m is a positive integer in the range m∈{1, . . . , M}, and
(vi) n and p are positive integers in the range n∈{1, . . . , N};
receive, from the radio channel during the frame, a third modulated radio-frequency carrier signal via an antenna;
demodulate the third modulated radio-frequency carrier signal to recover the first data item d(1,1) and the second data item d(M,1); and
transmit the first data item d(1,1) in association with the first wireless terminal and the second data item d(M,1) in association with the second wireless terminal.

2. The base station apparatus of claim 1, wherein j and k are positive integers in the range m∈{1, . . . , M}, and wherein a basic waveform b(j) and a basic waveform b(k) are orthogonal for j≠k.

3. The base station apparatus of claim 1, wherein the basic waveform b(m) is waveform m in an M-ary stepped-pulse waveform scheme.

4. The base station apparatus of claim 1, wherein the bandwidth of the radio channel is B Hz, and the duration of the basic waveform b(m) is M/B seconds.

5. The base station apparatus of claim 1, wherein the bandwidth of the radio channel is B Hz, and the duration of the waveform φ(m,n) is MN/B seconds.

6. A base station apparatus, comprising:
a processor configured to:
transmit:
(a) a first command to a first wireless terminal to transmit, into a radio channel during a frame, a first modulated radio-frequency carrier signal that is modulated with a first waveform φ(1,1) and a first data item d(1,1), and
(b) a second command to a second wireless terminal to transmit, into the radio channel during the frame, a second modulated radio-frequency carrier signal that is modulated with a second waveform φ(1,N) and a second data item d(1,N),
wherein:
(i) the waveform φ(m,n) is partitioned into N time slots 1, . . . , p, . . . , N,
(ii) time slot p of the waveform φ(m,n) comprises a basic waveform b(m) multiplied by exp[2π(n−1)(p−1)i/N],
(iii) the first waveform φ(1,1) is multiplied by the first data item d(1,1), and the second waveform φ(1,N) is multiplied by the second data item d(1,N),
(iv) M and N are positive integers greater than 1,
(v) m is a positive integer in the range m∈{1, . . . , M}, and
(vi) n and p are positive integers in the range n∈{1, . . . , N};
receive, from the radio channel during the frame, a third modulated radio-frequency carrier signal via an antenna;
demodulate the third modulated radio-frequency carrier signal to recover the first data item d(1,1) and the second data item d(1,N); and
transmit the first data item d(1,1) in association with the first wireless terminal and the second data item d(1,N) in association with the second wireless terminal.

7. The base station apparatus of claim 6, wherein j and k are positive integers in the range m∈{1, . . . , M}, and wherein a basic waveform b(j) and a basic waveform b(k) are orthogonal for j≠k.

8. The base station apparatus of claim 6, wherein the basic waveform b(m) is waveform m in an M-ary stepped-pulse waveform scheme.

9. The base station apparatus of claim 6, wherein the bandwidth of the radio channel is B Hz, and the duration of the basic waveform b(m) is M/B seconds.

10. The base station apparatus of claim 6, wherein the bandwidth of the radio channel is B Hz, and the duration of the waveform φ(m,n) is MN/B seconds.

11. A base station apparatus, comprising:
a processor configured to:
transmit:
(a) a first command to a first wireless terminal to transmit, into a radio channel during a frame, a first modulated radio-frequency carrier signal that is modulated with a first waveform φ(1,1) and a first data item d(1,1), and
(b) a second command to a second wireless terminal to transmit, into the radio channel during the frame, a second modulated radio-frequency carrier signal that is modulated with a second waveform φ(M,N) and a second data item d(M,N),
wherein:
(i) the waveform φ(m,n) is partitioned into N time slots 1, . . . , p, . . . , N,
(ii) time slot p of the waveform φ(m,n) comprises a basic waveform b(m) multiplied by exp[2π(n−1)(p−1)i/N],
(iii) the first waveform φ(1,1) is multiplied by the first data item d(1,1), and the second waveform φ(M,N) is multiplied by the second data item d(M,N),
(iv) M and N are positive integers greater than 1,
(v) m is a positive integer in the range m∈{1, . . . , M}, and
(vi) n and p are positive integers in the range n∈{1, . . . , N};
receive, from the radio channel during the frame, a third modulated radio-frequency carrier signal via an antenna;
demodulate the third modulated radio-frequency carrier signal to recover the first data item d(1,1) and the second data item d(M,N); and
transmit the first data item d(1,1) in association with the first wireless terminal and the second data item d(M,N) in association with the second wireless terminal.

12. The base station apparatus of claim 11, wherein j and k are positive integers in the range m∈{1, . . . , M}, and wherein a basic waveform b(j) and a basic waveform b(k) are orthogonal for j≠k.

13. The base station apparatus of claim 11, wherein the basic waveform b(m) is waveform m in an M-ary stepped-pulse waveform scheme.

14. The base station apparatus of claim 11, wherein the bandwidth of the radio channel is B Hz, and the duration of the basic waveform b(m) is M/B seconds.

15. The base station apparatus of claim 11, wherein the bandwidth of the radio channel is B Hz, and the duration of the waveform $\varphi(m,n)$ is MN/B seconds.

16. A base station apparatus, comprising:
a processor configured to:
  transmit:
    (a) a first command to a first wireless terminal to transmit, into a radio channel during a frame, a first modulated radio-frequency carrier signal that is modulated with a first waveform $\varphi(M,1)$ and a first data item d(M,1), and
    (b) a second command to a second wireless terminal to transmit, into the radio channel during the frame, a second modulated radio-frequency carrier signal that is modulated with a second waveform $\varphi(1,N)$ and a second data item d(1,N),
  wherein:
    (i) the waveform $\varphi(m,n)$ is partitioned into N time slots 1, . . . , p, . . . , N,
    (ii) time slot p of the waveform $\varphi(m,n)$ comprises a basic waveform b(m) multiplied by $\exp[2\pi(n-1)(p-1)i/N]$,
    (iii) the first waveform $\varphi(M,1)$ is multiplied by the first data item d(M,1), and the second waveform $\varphi(1,N)$ is multiplied by the second data item d(1,N),
    (iv) M and N are positive integers greater than 1,
    (v) m is a positive integer in the range $m \in \{1, \ldots, M\}$, and
    (vi) n and p are positive integers in the range $n \in \{1, \ldots, N\}$;
  receive, from the radio channel during the frame, a third modulated radio-frequency carrier signal via an antenna;
  demodulate the third modulated radio-frequency carrier signal to recover the first data item d(M,1) and the second data item d(1,N); and
  transmit the first data item d(M,1) in association with the first wireless terminal and the second data item d(1,N) in association with the second wireless terminal.

17. The base station apparatus of claim 16, wherein j and k are positive integers in the range $m \in \{1, \ldots, M\}$, and wherein a basic waveform b(j) and a basic waveform b(k) are orthogonal for $j \neq k$.

18. The base station apparatus of claim 16, wherein the basic waveform b(m) is waveform m in an M-ary stepped-pulse waveform scheme.

19. The base station apparatus of claim 16, wherein the bandwidth of the radio channel is B Hz, and the duration of the basic waveform b(m) is M/B seconds.

20. The base station apparatus of claim 16, wherein the bandwidth of the radio channel is B Hz, and the duration of the waveform $\varphi(m,n)$ is MN/B seconds.

21. A wireless communication system, comprising:
a first wireless terminal, comprising:
  a first processor configured to:
    receive a first command to transmit a first modulated radio-frequency carrier signal into a radio channel during a frame, wherein the first modulated radio-frequency carrier signal is modulated with a first waveform $\varphi(1,1)$ and a first data item d(1,1), and
  wherein:
    (i) the waveform $\varphi(m,n)$ is partitioned into N time slots 1, . . . , p, . . . , N,
    (ii) time slot p of the waveform $\varphi(m,n)$ comprises a basic waveform b(m) multiplied by $\exp[2\pi(n-1)(p-1)i/N]$,
    (iii) the first waveform $\varphi(1,1)$ is multiplied by the first data item d(1,1),
    (iv) M and N are positive integers greater than 1,
    (v) m is a positive integer in the range $m \in \{1, \ldots, M\}$, and
    (vi) n and p are positive integers in the range $n \in \{1, \ldots, N\}$, and
  modulate a first radio-frequency carrier signal with the first waveform $\varphi(1,1)$ and the first data item d(1,1) to generate the first modulated radio-frequency carrier signal; and
a first antenna configured to:
  radiate the first modulated radio-frequency carrier signal into the radio channel during the frame; and
a second wireless terminal, comprising:
  a second processor configured to:
    receive at a second wireless terminal a second command to transmit a second modulated radio-frequency carrier signal into the radio channel during the frame, wherein the second modulated radio-frequency carrier signal is modulated with a second waveform $\varphi(M,N)$ and a second data item d(M,N), and
    modulate at the second wireless terminal a second radio-frequency carrier signal with the second waveform $\varphi(M,N)$ and the second data item d(M,N) to generate the second modulated radio-frequency carrier signal; and
  a second antenna configured to:
    radiate the second modulated radio-frequency carrier signal into the radio channel during the frame.

22. The wireless communication system of claim 21, wherein j and k are positive integers in the range $m \in \{1, \ldots, M\}$, and wherein a basic waveform b(j) and a basic waveform b(k) are orthogonal for $j \neq k$.

23. The wireless communication system of claim 21, wherein the basic waveform b(m) is waveform m in an M-ary stepped-pulse waveform scheme.

24. The wireless communication system of claim 21, wherein the bandwidth of the radio channel is B Hz, and the duration of the basic waveform b(m) is M/B seconds.

25. The wireless communication system of claim 21, wherein the bandwidth of the radio channel is B Hz, and the duration of the waveform $\varphi(m,n)$ is MN/B seconds.

26. A wireless communication system, comprising:
a first wireless terminal, comprising:
  a first processor configured to:
    receive a first command to transmit a first modulated radio-frequency carrier signal into a radio channel during a frame, wherein the first modulated radio-frequency carrier signal is modulated with a first waveform $\varphi(M,1)$ and a first data item d(M,1), and
  wherein:
    (i) the waveform $\varphi(m,n)$ is partitioned into N time slots 1, . . . , p, . . . , N,
    (ii) time slot p of the waveform $\varphi(m,n)$ comprises a basic waveform b(m) multiplied by $\exp[2\pi(n-1)(p-1)i/N]$, (iii) the first waveform φ(M,1) is multiplied by the first data item d(M,1),
(iv) M and N are positive integers greater than 1,
(v) m is a positive integer in the range m∈{1, . . . , M}, and
(vi) n and p are positive integers in the range n∈{1, . . . , N}, and
modulate a first radio-frequency carrier signal with the first waveform φ(M,1) and the first data item d(M,1) to generate the first modulated radio-frequency carrier signal; and
a first antenna configured to:
radiate the first modulated radio-frequency carrier signal into the radio channel during the frame; and
a second wireless terminal, comprising:
a second processor configured to:
receive at a second wireless terminal a second command to transmit a second modulated radio-frequency carrier signal into the radio channel during the frame, wherein the second modulated radio-frequency carrier signal is modulated with a second waveform φ(1,N) and a second data item d(1,N), and
modulate at the second wireless terminal a second radio-frequency carrier signal with the second waveform φ(1,N) and the second data item d(1,N) to generate the second modulated radio-frequency carrier signal; and
a second antenna configured to:
radiate the second modulated radio-frequency carrier signal into the radio channel during the frame.

27. The wireless communication system of claim 26, wherein j and k are positive integers in the range m∈{1, . . . , M}, and wherein a basic waveform b(j) and a basic waveform b(k) are orthogonal for j≠k.

28. The wireless communication system of claim 26, wherein the basic waveform b(m) is waveform m in an M-ary stepped-pulse waveform scheme.

29. The wireless communication system of claim 26, wherein the bandwidth of the radio channel is B Hz, and the duration of the basic waveform b(m) is M/B seconds.

30. The wireless communication system of claim 26, wherein the bandwidth of the radio channel is B Hz, and the duration of the waveform φ(m,n) is MN/B seconds.

* * * * *